United States Patent
Quesnel

[11] Patent Number: 6,135,398
[45] Date of Patent: Oct. 24, 2000

[54] TRUNION CLAMP FOR OPTICAL FIBER

[75] Inventor: Wayne L. Quesnel, Moore, S.C.

[73] Assignee: Alcoa Fujikura Limited, Brentwood, Tenn.

[21] Appl. No.: 09/215,949

[22] Filed: Dec. 18, 1998

Related U.S. Application Data

[60] Provisional application No. 60/068,263, Dec. 19, 1997.

[51] Int. Cl.[7] ................................................. F16L 3/12
[52] U.S. Cl. ........................................ 248/74.1; 248/74.4
[58] Field of Search ................................. 248/74.1, 74.4, 248/66, 58, 63, 68.1; 16/266, 386, 254, 260

[56] References Cited

U.S. PATENT DOCUMENTS

| | | | |
|---|---|---|---|
| 2,026,260 | 12/1935 | Tarbox | 248/66 |
| 3,061,253 | 10/1962 | Keaton | 248/74.1 |
| 3,274,654 | 9/1966 | Becker | 24/125 |
| 3,547,386 | 12/1970 | Burgess | 248/63 |
| 3,623,687 | 11/1971 | Nordstrom | 248/74.1 |
| 5,014,941 | 5/1991 | Sherman | 248/74.4 |
| 5,141,187 | 8/1992 | Sherman | 248/74.4 |
| 5,146,667 | 9/1992 | Sherman | 29/433 |
| 5,261,633 | 11/1993 | Mastro | 248/74.1 |
| 5,355,557 | 10/1994 | Cress et al. | 16/286 |
| 5,435,507 | 7/1995 | Murphy | 248/74.4 |
| 5,742,982 | 4/1998 | Dodd et al. | 24/16 R |

FOREIGN PATENT DOCUMENTS

| | | | |
|---|---|---|---|
| 809340 | 11/1997 | European Pat. Off. | H02G 7/05 |
| 604761 | 10/1934 | Germany . | |
| 9720371 | 6/1997 | WIPO | H02G 7/05 |

*Primary Examiner*—Ramon O. Ramirez
*Attorney, Agent, or Firm*—Tracey D. Beiriger

[57] ABSTRACT

An easily installable, robust device capable of securing and supporting cable even under extreme weather and loading conditions. The device supports cable during and after stringing of the cable. The device is easily adaptable to accommodate a large range of cable diameters and can be mounted to a variety of support structures.

The device includes a body and cap formed via die casting. A non-machined hinge mechanism that is die cast as a portion of both the body and the cap connects the same and allows the device to be mounted as a single unit to a support structure. A two piece grooved elastomer bushing seats in the body and cap to surround and cushion the cable extending through the device. By altering the size of the grooves of the bushing, various diameter cable can be accommodated.

Side walls having windows formed on the body of the trunion help facilitate distribution of the load of the cable. The tunion body also includes a non-threaded hole that may be used in conjunction with a fastener such as a lag bolt or a double arming bolt to secure the trunion to a support structure.

20 Claims, 7 Drawing Sheets

TRUNION CLAMP FOR OPTICAL FIBER

CROSS REFERENCE TO RELATED APPLICATIONS

This application claims the benefit of U.S. Provisional Application Ser. No. 60/068,263, filed on Dec. 19, 1997, the disclosure of which is fully incorporated by reference herein.

FIELD OF THE INVENTION

This invention relates to a support device or trunion clamp for stringing and supporting cables, preferably fiber optic cables, to poles or towers, and a method of stringing and securing such cable to poles, towers or other support structures.

BACKGROUND OF THE INVENTION

Fiber optic cables are widely used for data transmission and require careful handling because of the fragile optical fibers being carried and protected by such cables. These cables are suspended from support structures via support devices and are subject to various dynamic and static stresses that must be controlled. Static stress is caused primarily because the cable is suspended only at longitudinally distanced points while dynamic stress is caused mainly by oscillation of the cable. This oscillation, generally resulting from wind, ice and varying temperatures affecting tension of the cable can damage the cable and associated fibers. Many support devices do not adequately control the effect that stresses have on the cable. For instance, the support device must permit a limited amount of oscillation but not so much as to cause damage to the fibers.

Nor do many of the support devices facilitate ease of stringing the cable. Along with supporting the cable, the device must accommodate the required sag of the cable between support structures. Also, the device must allow cable to slip before fiber damage occurs, yet maintain the cable to required installation tensions. Typically the devices require disassembly, have many parts and do not reassemble easily. As the cables are strung and repaired in the field where non-optimal conditions are almost a certainty, a device that allows for quick and easy stringing of the cable is desired.

Further, many of the support devices do not easily attach to the designated support structure. For example, U.S. Pat. No. 5,014,941 ('941) discloses a fiber optic cable support assembly that includes two body portions providing a central bore. An internally threaded aperture in one body portion permits the assembly to be attached to a structure having a pre-embedded fastener, although the body portion must be rotated to attach the assembly to a support structure. Obviously this rotation precludes stringing the cable until after the device is attached to the structure and over all complicates the installation of the assembly. Also, this device includes several loose parts that must be maintained during installation.

U.S. Pat. No. 5,435,507 ('507) also discloses a cable support Typically, the '507 device is used for low tension, short span applications that utilize small diameter cable. Although this device overcomes some of the problems associated with the '941 device, it has its own inherent shortcomings. The device must be secured to a support structure via a bolt. That is, the bolt is embedded into the support structure such as a pole, and an associated nut is tightened. Also, the device uses a capturing feature for the head of the mounting bolt which limits the type of fastener that can be used to secure the device. Further, the device provides gains that are intended to bite into and grip the support structure. Thus, the device can not be used on a support structure that can not receive a bolt or accommodate these gains. Even if the device could somehow be secured to a support structure absent the use of the bolt, the gains would severely weaken the contact achievable between the device and the support structure. Like the '941 device, this device has loose parts that must be maintained during installation. Also, the device employs a cushion that the installer must correctly wrap around the cable.

SUMMARY OF THE INVENTION

The present invention provides an easily installable, robust device capable of securing and supporting fiber optic cable even under extreme weather and loading conditions. The support device or trunion clamp of the present invention supports fiber optic cable during and after stringing the fiber optic cable. The device is easily adaptable to accommodate a large range of cable diameters and can be mounted to a variety of support structures.

According to the present invention, there is provided a two-piece support device, including a body and cap formed via die casting. A non-machined hinge mechanism connects the body and cap and allows the device to be mounted as a single unit to a support structure. A two piece grooved elastomer bushing seats in the body and cap to surround and cushion the cable extending through the device when the cap and body are mated. By altering the size of the grooves of the bushing, various diameter cable can be accommodated.

Side walls having windows formed on the body of the trunion help facilitate distribution of the load of the cable. The trunion body also includes a non-threaded hole that may be used in conjunction with a fastener such as a lag bolt or a double arming bolt to secure the trunion to a support structure.

A principal advantage of the invention is the ease of installation of the device.

Another advantage of the invention is that no separate parts need to be handled during installation of the device or at other times when the device needs to be accessed.

Yet another advantage of the invention is that the device facilitates optimal loading of the cable even under severe conditions.

Still another advantage of the invention is that the device can easily be adapted prior to installation to accommodate a variety of fiber optic cable sizes.

Yet still another advantage of the invention is that the device has been designed to enable it to be attached to a variety of support structures.

Still other advantages and benefits of the invention will become apparent to those skilled in the art upon a reading and understanding of the following detailed description.

DETAILED DESCRIPTION

The cable support device or trunion 10, as shown in FIGS. 1–5, includes a body 12 and a corresponding cap 14. Body 12 and cap 14 mate via a non-machined hinge type mechanism 16 that is preferably die cast as a portion of both body 12 and cap 14. Hinge mechanism 16 includes hinge 18 and bracket 20. Hinge 18 is integrally formed as part of cap 14 and mates with bracket 20 which is integrally formed as part of body 12. To mate cap 14 and body 12, cap 14 is rotated approximately 90 degrees from its upright position and hinge 18 is inserted into slot 22 of bracket 20. Cap 14 is then rotated back to its upright position so that wings 24 of hinge 18 slide into groove slots 26 of bracket 20. By aligning wings 24 and groove slots 26, body 12 and cap 14 are properly mated. Once mated, body 12 and cap 14 do not need to be completely separated during installation, or when receiving cable 28. Device 10, however, can be disassembled without tools and parts of the device can be replaced if needed.

Figure 1:
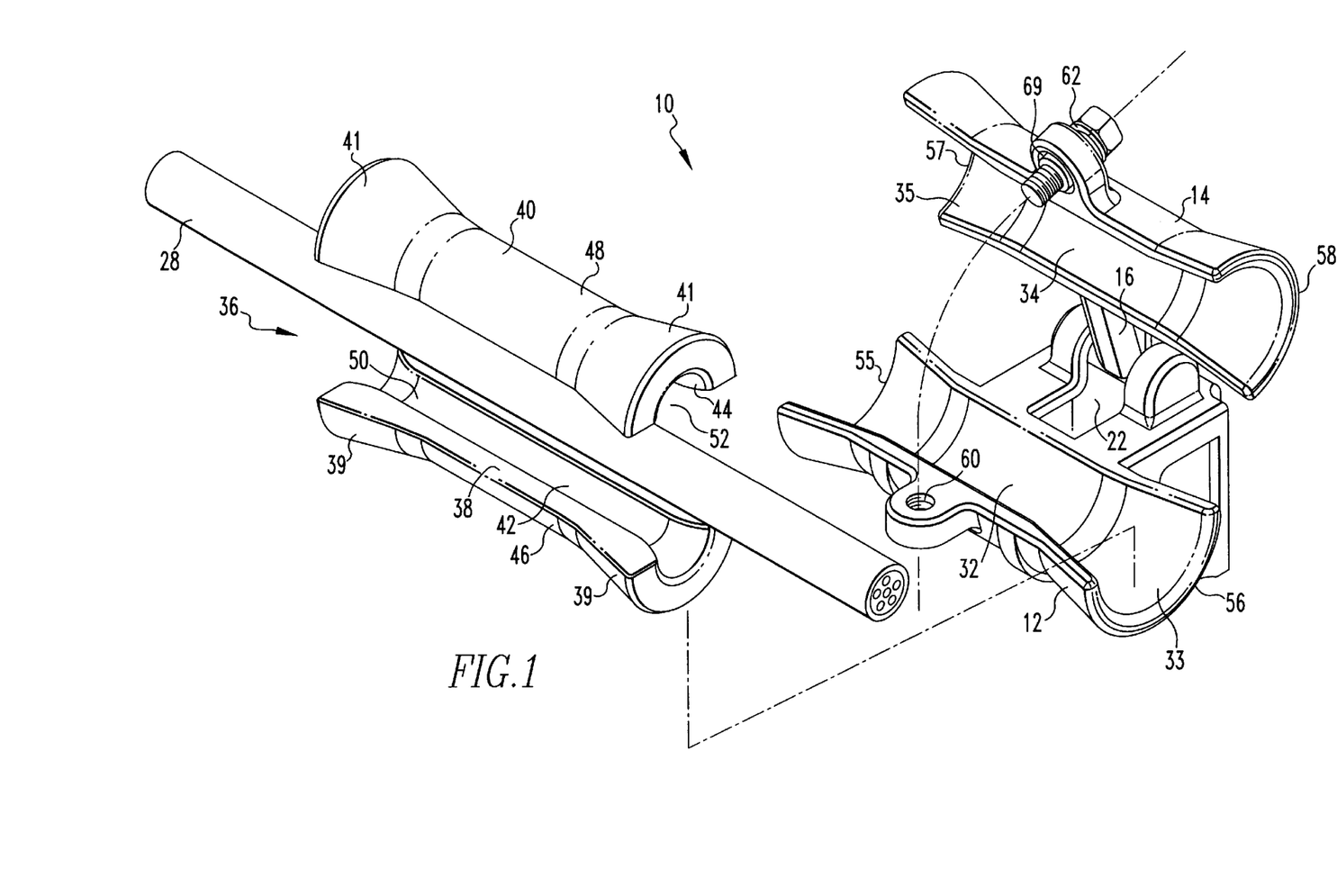
FIG. 1 is an exploded perspective view of the support device receiving a fiber optic cable.
Figure 2:
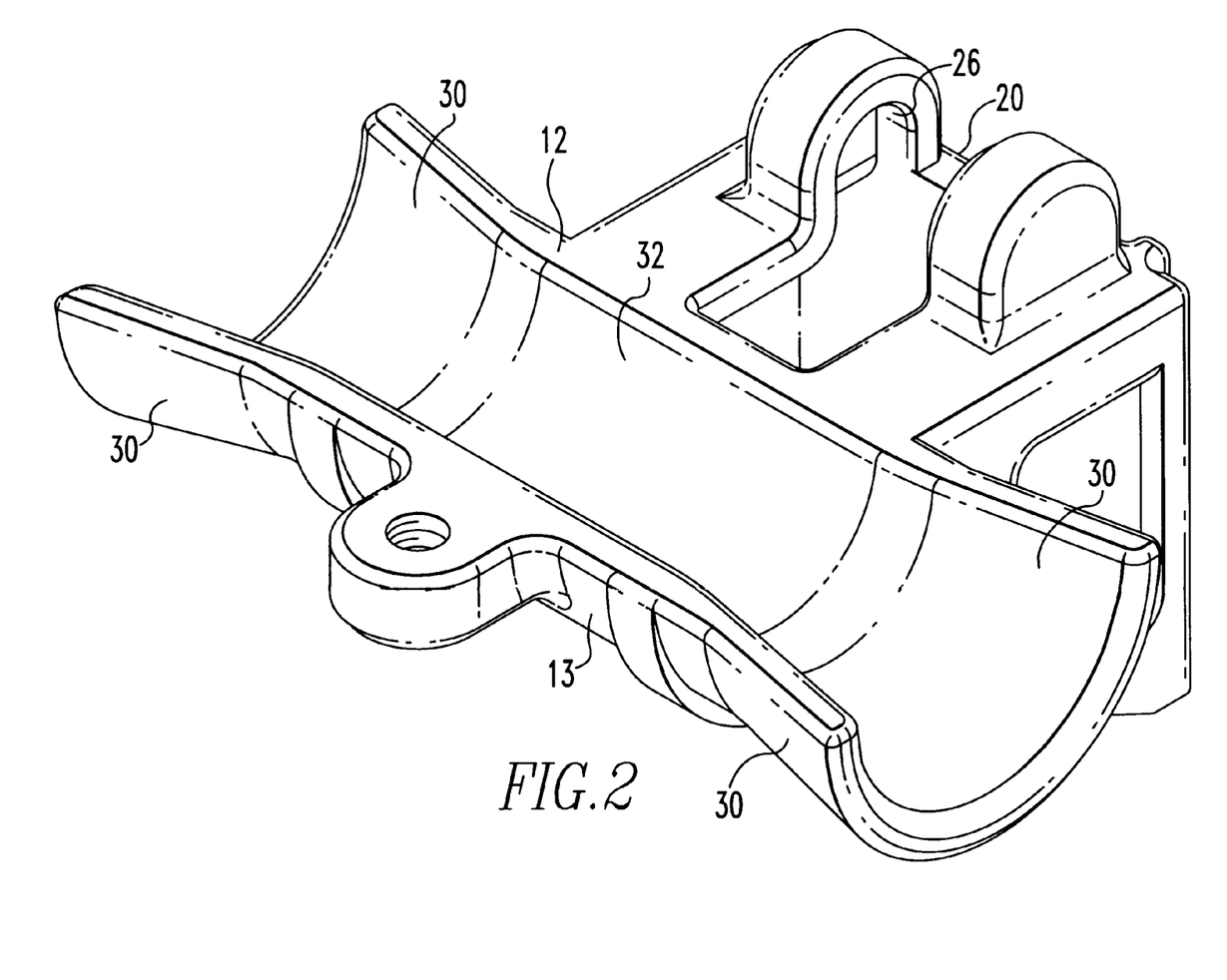
FIG. 2 is a perspective view of the body of the support device without the body bushing.
Figure 3:
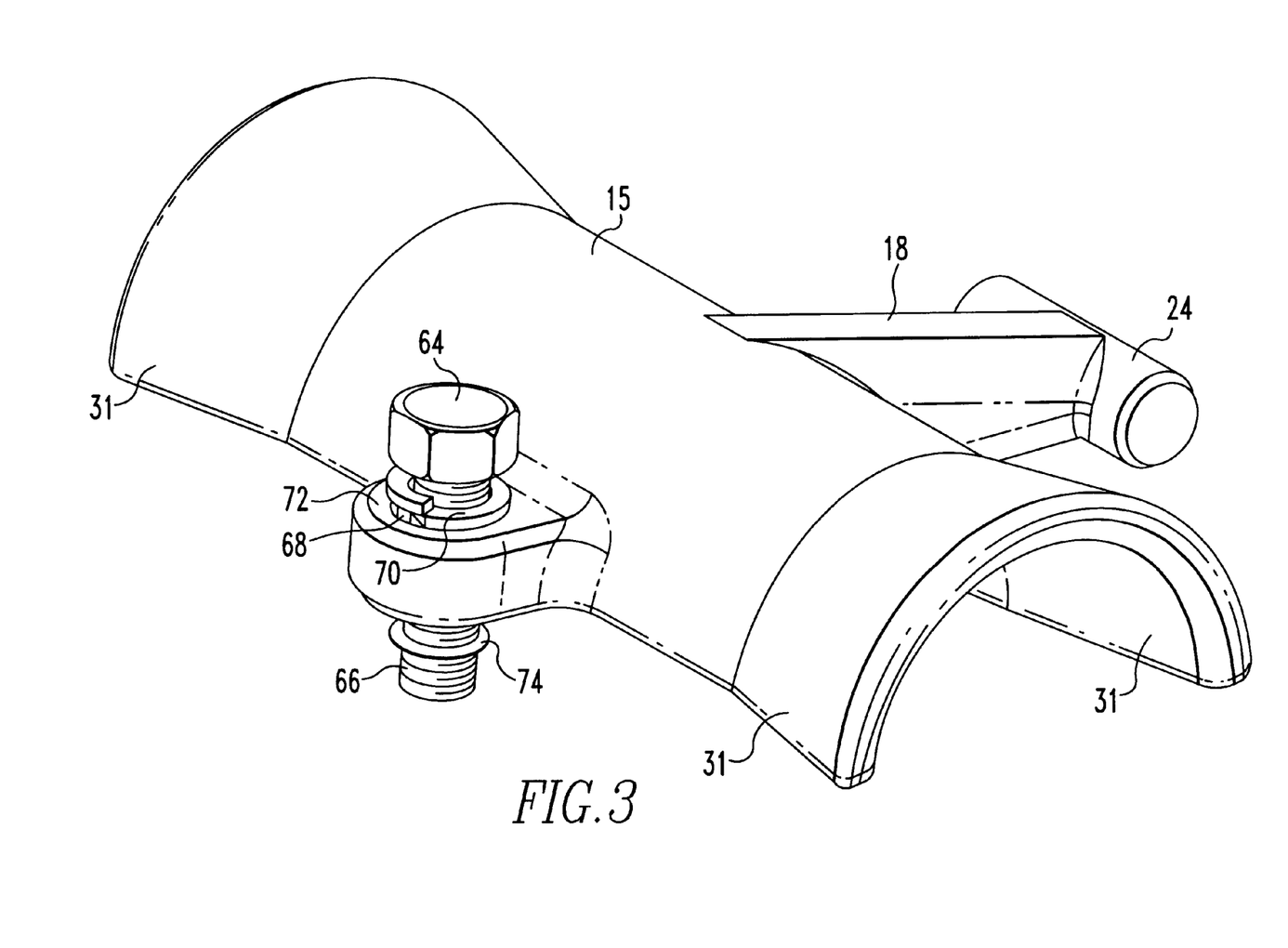
FIG. 3 is a perspective view of the cap of the support device without the cap bushing.
Figure 4:
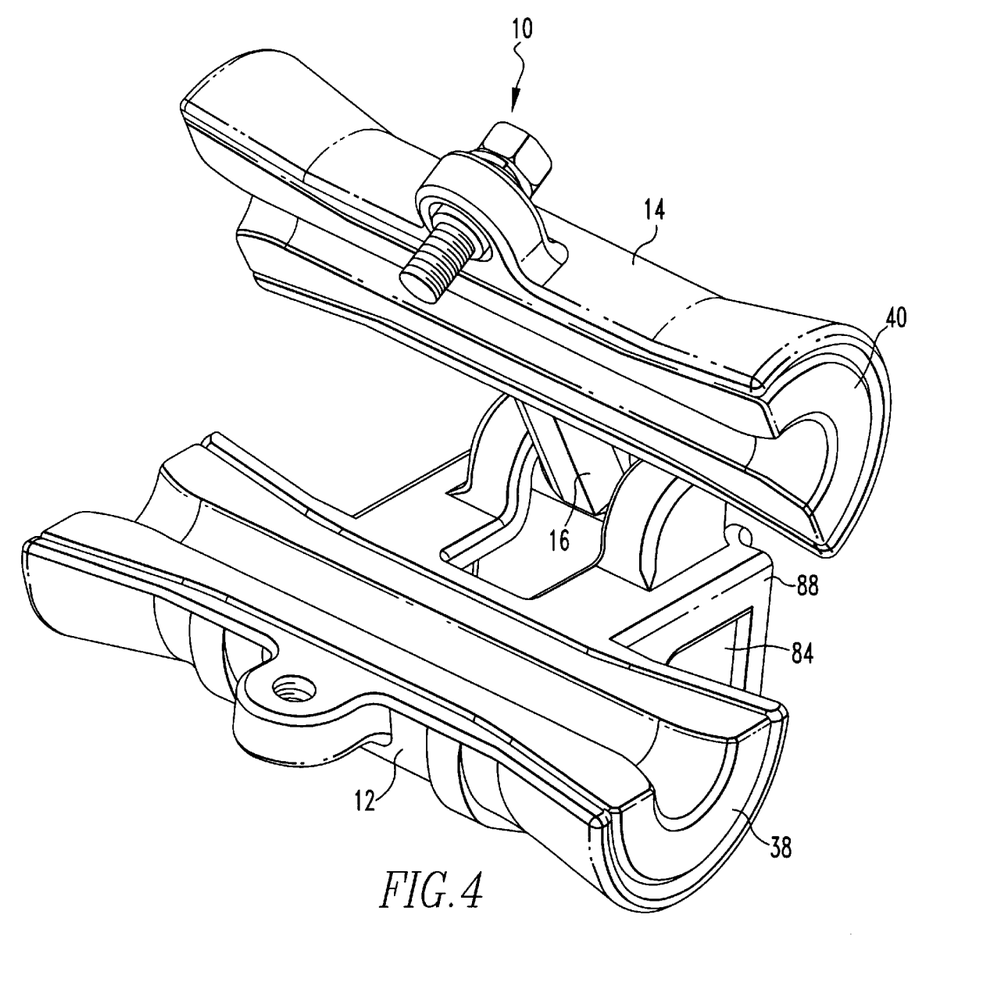
FIG. 4 is a perspective view of the assembled support device including the bushings in its open position.

Body 12 and cap 14 define body groove 32 and cap groove 34 respectively. Body groove 32 extends longitudinally from first end 55 to the opposite end 56 of arcuate portion 13 of body 12 while cap groove 34 extends longitudinally from first end 57 to opposite end 58 of arcuate portion 15 of cap 14. Body groove 32 and cap groove 34 are provided by the u-shaped inner surfaces 33 and 35 of arcuate portion 13 of body 12 and arcuate portion 15 of cap 14 respectively. When body 12 and cap 14 are aligned and mated, body groove 32 and cap groove 34 create channel 36. Body groove 32 and cap groove 34 receive body bushing 38 and cap bushing 40 for encompassing, gripping and cushioning cable 28.

Body bushing 38 and cap bushing 40 have inner surfaces 42 and 44 and outer surfaces 46 and 48 respectively. The outer surfaces 46 and 48 of body bushing 38 and cap bushing 40 are arcuate and sized to snugly mate with u-shaped inner surfaces 33 and 35 of body 12 and cap 14. Inner surfaces 42 and 44 of body bushing 38 and cap bushing are each provided with a central grooves, 50 and 52 respectively. When bushings 38 and 40 are placed in grooves 32 and 34 and body 12 and cap 14 are mated, body bushing groove 50 and cap bushing groove 52 form bushing channel 54 which directly contacts and holds cable 28. Simply by varying the size of grooves 50 and 52, cables having a range of diameters can be accommodated by trunion 10. Thus, it is not necessary to manipulate the device to fit different diameter cables at the time of installation.

Bushings 38 and 40 are made of a molded elastomer material, preferably a compliant material such as EPDM rubber made for outdoor applications. The elastomer material provides excellent slip strength and is able to hold the cable to acceptable slip loads of at least 400 pounds without causing attenuation to the optical fibers. Further, the elastomer material has a dielectric constant that is close to the dielectric constant of ADSS cable jacket which is of the type of cable generally strung using a trunion as described herein. Closely matching these dielectric constants helps to minimize leakage current resulting from electric charge build up caused by the fiber optic cables close proximity to power cables. Such an electric discharge will eventually degrade the cable at the bushing interface.

Body 12 and cap 14 have radially and axially extending flared edges 30 and 31, respectively. The associated bushings also have flared edges 39 and 41, respectively. These flared edges limit relative axial movement between the bushings and the body and cap. Also the bushings are held in place by the surface friction created because of the dissimilar materials used for the bushing and the body and cap. That is, the body and cap have aluminum casting surfaces that are gripped by the elastomer bushing.

Figure 5:
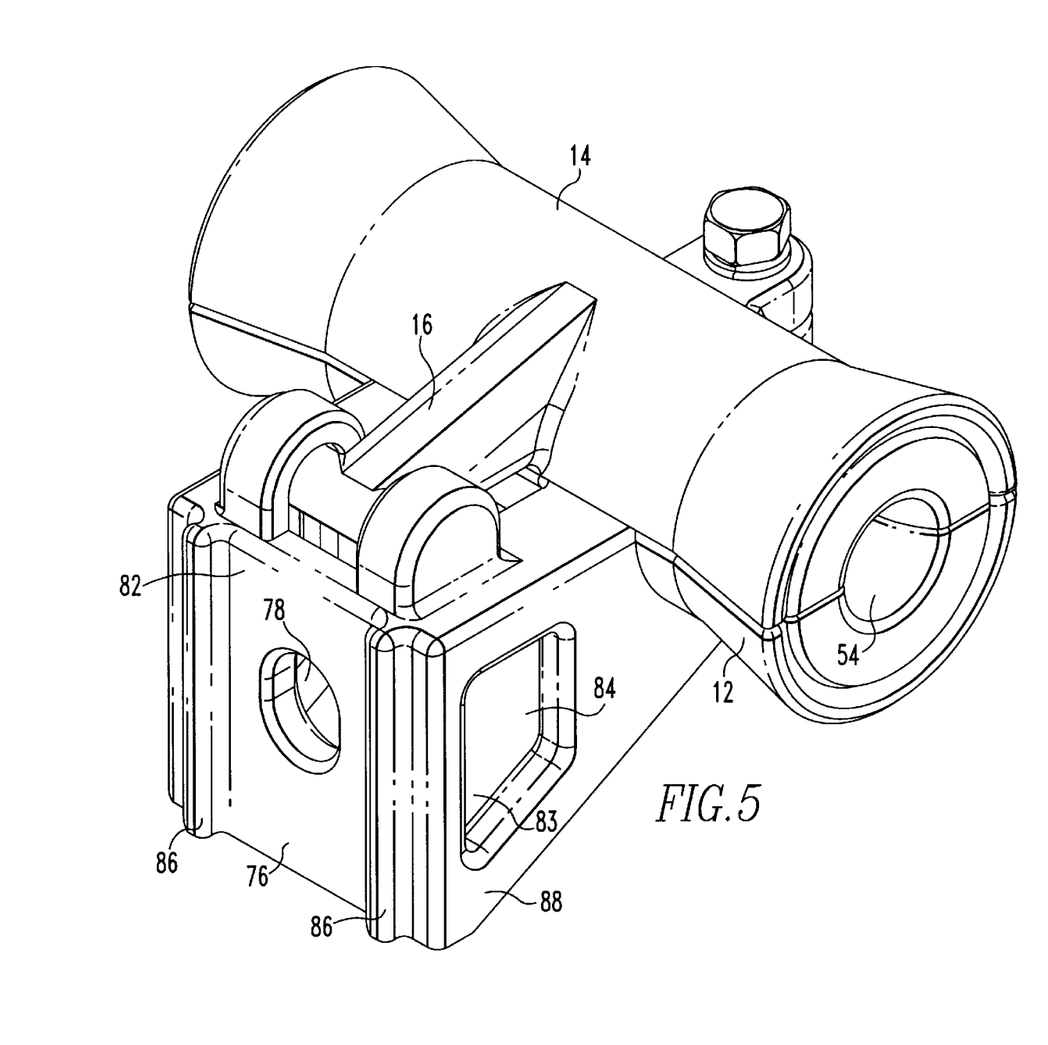
FIG. 5 is a perspective view of the assembled support device including the bushings in its closed position.

Trunion body 12 includes a threaded aperture 60 that is used in conjunction with a fastener such as a bolt 62 to secure cap 14 and body 12 after cable 28 has been placed in bushing channel 54. Cap 14 includes a non-threaded opening 68 that aligns with aperture 60 when cap 14 and body 12 are mated. Prior to installation, as shown by FIG. 5, a loosely fitted lock washer 70 is put onto bolt stem 66 and bolt 62 is inserted into opening 68 of cap 14 causing washer 70 to contact bolt head 64 and the outer surface 72 of opening 68. Also prior to installation, an tightly fitted o-ring 74 is placed on bolt stem 66. That is, bolt 62 and lock washer 70 are used in combination to tighten the device about the cable. O-ring 74 prevents bolt 62 and lock washer 70 from falling out of opening 68 when cap 14 and body 12 of the trunion are opened during stringing of the cable and final assembly. O-ring 74 is pushed up into the lower enlarged end 69 of opening 68 when bolt 62 is tightened. Again, this invention minimizes loose assembly parts in the field. Thus, there are not loose parts, bolts, nuts or the like that have to be carefully retained when the cable is run through bushing channel 54.

Figure 6A:
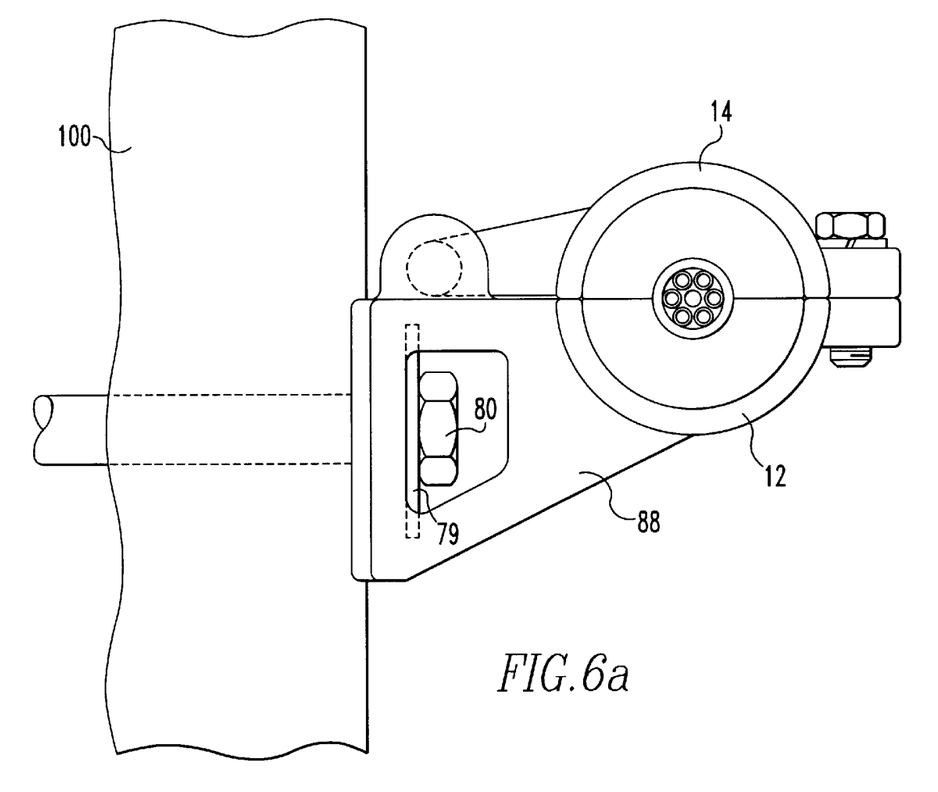
FIG. 6a is a perspective view of the support device affixed to a support structure, via a bolt.

Body 12 of trunion 10 includes mounting surface 76 that has aperture 78 for receiving a mounting bolt 80 as shown in FIG. 1. To install the device, trunion 10 is properly aligned with support structure 100 and mounting bolt 80 is simply tightened and imbedded into support structure 100 to affix trunion 10 to support structure 100 as shown in FIG. 6a. A square washer 79 is used to distribute the force of bolt 80 over the mounting surface. Square washer 79 also prevents wings 24 of hinge 18 from sliding out of groove slots 26 of bracket 20. That is, when bolt 62 is loosened and cap 14 and body 12 are opened, for example, to receive the bushings during final assembly, cap 14 is held in place by washer 79. Note that the device of this invention is installed without having to thread the trunion to a bolt or stud protruding from a support structure or rotating the trunion which can be quite cumbersome.

It is, however, also possible to secure the trunion to a support structure using a double arming bolt as is commonly used. When using an arming bolt with this invention, however, it is not necessary to be overly concerned with how far the bolt extends from the support structure as is often the case with existing designs. The bolt only has to extend through the somewhat thin wall of the body of mounting surface 76 on which aperture 78 is located.

Figure 6B:
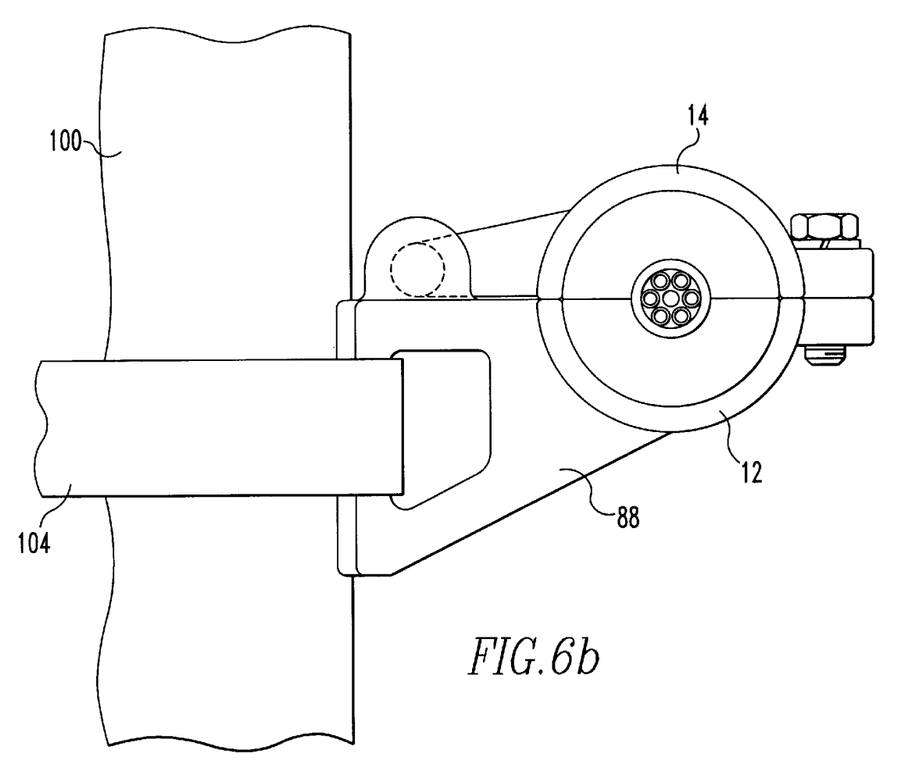
FIG. 6b is a perspective view of the support device banded to a support structure.

Along with securing the trunion to a support structure via a fastener such as a bolt, the trunion can also be secured using banding without the use of a separate adapter as shown in FIG. 6b. Body 12 of trunion 10, has side walls 88 extending between mounting surface 76 and arcuate portion 13 of body 12. Banding windows 84 are formed on side walls 88 to receive, for example, a metal banding strip 102 that can be wrapped about the support structure to secure the trunion, as shown in FIG. 6b. Users may prefer this type of securing method when a concrete or steel support structure is used.

Body 12 of the trunion also has anti-rotational legs 86 on outer surface 82 of mounting surface 76 that grip and match the contour of support structure 100. Legs 86 prevent rotation of the trunion about the support structure, regardless of the material from which the structure is made, including wood, metal or concrete.

Inner surface 83 of mounting surface 76 of body 12 along with side walls 88 are designed to facilitate distribution of the load of cable 28 on the device. Side walls 88 extend partially around arcuate portion 13 of body 12 to help minimize stress and better distribute the load of the cable. Thus, forces are distributed evenly through the device and no areas of high stress are generated by stringing the cable, during final assembly or use of the device.

The trunion body 12 and cap 14 are preferably made of aluminum via a die casting process that provides surfaces sufficiently smooth without further machining or polishing to use the device as a stringing block. The smooth surface prevents damage or abrasion to the cable when the device is used without bushings to string cable prior to final assembly. Many current devices require that special polishing processes be used after machining to achieve acceptable surface finishes for the areas of the trunion that directly contact the cable. Ball burnishing may be used rather than die casting to create acceptable cable contacting surfaces.

The device of this invention is designed to handle cable loading even under extreme weather conditions. The device can easily withstand maximum vertical forces of about 1600 pounds. The device is also able to bear cable loading resulting from wind velocities of 110 mph in a maximum span of 600 feet and can withstand longitudinal unbalanced ice loading. The device also permits greater flexibility than existing support devices to alter the line angle of the cable up to about 22 degrees. Thus, this device is an easily installable, reduced cost, superior functioning cable stringing and support device.

Having described the presently preferred embodiments, it is to be understood that the invention may be otherwise embodied within the scope of the appended claims.

What is claimed is:

1. A cable support device for supporting a fiber optic cable comprising:
   a body having an inner grooved surface defining a body groove extending longitudinally from a first end to an opposite end of said body;
   a cap having an inner grooved surface defining a cap groove extending longitudinally from a first end to an opposite end of said cap;
   a hinge mechanism for connecting and aligning said body and said cap prior to stringing said cable such that said body groove and said cap groove define a channel through which the cable extends, said hinge mechanism comprising a hinge integrally formed as part of said cap and a bracket integrally formed as part of said body;
   a body bushing having an outer surface and an inner grooved surface, said outer surface configured to seat within said body groove; and
   a cap bushing having an outer surface and an inner grooved surface, said outer surface configured to seat within said cap groove such that when said body and cap are aligned and connected, said body bushing and said cap bushing define a channel for receiving the cable, wherein said body bushing and said cap bushing are formed from molded elastomer material having a dielectric constant close to the dielectric constant of said cable.

2. The device as defined in claim 1 wherein the size of said cap bushing groove and said body bushing groove can be varied to accommodate different diameter cable.

3. The device as defined in claim 1 wherein said body groove and said cap groove are unshaped and the outer surfaces of said body bushing and said cap bushing are arcuate.

4. The device as defined in claim 1 wherein said elastomer material is EPDM rubber.

5. The device as defined in claim 1 wherein said body and said cap are formed by die casting.

6. The device as defined in claim 5 wherein said hinge mechanism is die cast as a portion of said body and said cap.

7. The device as defined in claim 1 further comprising an integral means for securing said device to a support structure.

8. The device as defined in claim 7 wherein said securing means includes a mounting surface, said mounting surface having an aperture for securing said device to a support structure.

9. The device as defined in claim 8 wherein said mounting surface has an outer surface further comprising a plurality of legs that prevent rotation of said device when mounted to said support structure.

10. The device as defined in claim 7 wherein said securing means includes side walls and windows through which a plurality of bands may be threaded to secure said device to a support structure.

11. The device as defined in claim 10 wherein said body includes an arcuate portion, said side walls connecting said arcuate portion and said mounting surface, said side walls extending partially around said arcuate portion to facilitate load distribution of said cable.

12. The device as defined in claim 1 wherein said hinge provides hinge wings and said bracket provides a bracket slot for receiving said hinge wings such that said cap and said body are securely mated when said hinge and said bracket are engaged.

13. The device as defined in claim 12 wherein said cap is rotated about 90 degrees to engage said wings and said bracket.

14. The device as defined in claim 12 wherein said cap and said body are securely mated by:
   a) rotating said cap about 90 degrees from an upright position;
   b) inserting said hinge wings of said hinge into said bracket slot of said bracket; and
   c) rotating said cap back to its upright position such that said hinge wings slide into said bracket slot and said cap and said body are aligned and securely mated.

15. An improved fiber optic cable support device of the type in which a two piece device comprising a body and a cap defines a channel for receiving a cable, said body and said cap each having a groove, wherein the improvement comprises:
   a two piece hinge mechanism consisting of hinge wings integrally formed as a part of said cap and a bracket slot integrally formed as a part of said body, said hinge mechanism securing and aligning said body and said cap when said hinge wings and said bracket slot are engaged;
   a body bushing having an outer surface and an inner grooved surface, said outer surface configured to seat within said body groove; and
   a cap bushing having an outer surface and an inner grooved surface, said outer surface configured to seat within said cap groove such that when said body and cap are aligned and connected, said body bushing and said cap bushing define a channel for receiving the cable, wherein said body bushing and said cap bushing are formed from molded elastomer material having a dielectric constant close to the dielectric constant of said cable.

16. The device as defined in claim 15 wherein said cap is rotated about 90 degrees to engage said hinge wings and said bracket slot.

17. The device as defined in claim 15 wherein the size of said cap bushing groove and said body bushing groove can be varied to accommodate different diameter cable.

18. The device as defined in claim 15 wherein said body and said cap are formed by die casting.

19. The device as defined in claim 18 wherein said hinge mechanism is die cast as a portion of said body and said cap.

20. The device as defined in claim 15 further comprising an integral means for securing said device to a support structure.

* * * * *

UNITED STATES PATENT AND TRADEMARK OFFICE
CERTIFICATE OF CORRECTION

PATENT NO. : 6,135,398
DATED : October 24, 2000
INVENTOR(S) : Wayne L. Quesnel

It is certified that error appears in the above-identified patent and that said Letters Patent is hereby corrected as shown below:

Col. 6, line 2　　　　　　　Delete "unshaped" and substitute --u-shaped--.

Signed and Sealed this

Eighth Day of May, 2001

Attest:

NICHOLAS P. GODICI

Attesting Officer　　　Acting Director of the United States Patent and Trademark Office